United States Patent [19]
Abrams et al.

[11] 3,921,099
[45] Nov. 18, 1975

[54] FREQUENCY STABILIZED LASER
[75] Inventors: Richard L. Abrams, Pacific Palisades; Thomas A. Nussmeier, Thousand Oaks, both of Calif.
[73] Assignee: Hughes Aircraft Company, Culver City, Calif.
[22] Filed: Sept. 16, 1974
[21] Appl. No.: 506,476

[52] U.S. Cl. .................................... 331/94.5 S
[51] Int. Cl.² ...................................... H01S 3/13
[58] Field of Search ........................... 331/94.5

[56] References Cited
UNITED STATES PATENTS
3,622,908  11/1971  Skolnick .......................... 331/94.5 S
3,842,367  10/1974  Schlossberg .................... 331/94.5 S Primary Examiner—William L. Sikes
Attorney, Agent, or Firm—W. H. MacAllister; Paul M. Coble

[57] ABSTRACT

Arrangements are disclosed for the frequency stabilization of a laser using an external gas cell providing an absorption resonance which is controllably tuned by means of the linear Stark effect. An error signal, which locks the laser to the desired oscillation frequency, is generated either by dither modulation of the Stark-effect cell voltage or by differential absorption in a pair of Stark-effect cells having their absorption resonances stagger tuned about the desired laser oscillation frequency. The disclosed arrangements are especially suited to stabilization of a waveguide $CO_2$ laser operating on the P(20) 10.6$\mu$ laser transition. Advantages are the ability to stabilize the laser at any frequency within the laser tuning range and the elimination of undesired frequency modulation on the generated laser beam.

6 Claims, 8 Drawing Figures

FREQUENCY STABILIZED LASER

This invention relates to laser frequency stabilization, and more particularly relates to arrangements utilizing Stark absorption to stabilize a laser at any frequency within its tuning range.

A number of approaches to laser frequency stabilization have been employed previously, including frequency lock to a fixed absorption line in an external gas cell, and dither stabilization to the center of a Lamb dip in the laser power tuning characteristic, which results in stabilization of the laser to the line center frequency. Further details as to these approaches may be found in the respective papers "Standing-Wave Saturation Resonances in the $CO_2$ 10.6-$\mu$ Transitions Observed in a Low-Pressure Room-Temperature Absorber Gas" by C. Freed and A. Javan, *Applied Physics Letters*, Vol. 17 (1970), pages 53–56, and "Study of the Lamb Dip and of Rotational Competition in a Carbon Dioxide Laser" by C. Borde and L. Henry, *IEEE Journal of Quantum Electronics*, Vol QE-4 (1968), pages 874–880.

Laser stabilization schemes of the prior art generally were designed for accurate fixed frequency operation of gas lasers, for use as frequency standards and for spectroscopic applications. These schemes lacked the versatility of continuous frequency control and usually required some form of laser frequency modulation to generate the control signals, thereby introducing spurious frequency modulation on the laser output. For many applications in optical communications and radar, a need exists for frequency control of lasers over their complete tuning range with moderate precision (on the order of 1 MHz). In particular, tunable waveguide $CO_2$ lasers are likely to become very useful for heterodyne optical communication systems, but no simple technique had been devised for frequency control over the laser tuning range.

It is an object of the present invention to provide an arrangement for stabilizing a laser at any frequency within the laser tuning range.

It is a further object of the invention to provide an arrangement for frequency stabilizing a laser without introducing frequency modulation on the laser output.

It is still another object of the invention to provide a relatively simple and inexpensive system for achieving accurate and reliable laser frequency stabilization.

It is a still further object of the invention to provide a laser frequency control system especially suitable for a waveguide $CO_2$ laser.

The present invention achieves frequency stabilization of a laser using an external gas cell providing an absorption resonance which is controllably tuned by means of the linear Stark effect (the change in the spectrum of a molecule when subjected to an electric field). An error signal is generated either by dither modulation of the Stark-effect cell voltage or by differential absorption in a pair of Stark-effect cells having their absorption resonances stagger tuned about the desired laser oscillation frequency. The error signal is fed back to the laser to control the laser oscillation frequency so as to minimize the error signal and thereby stabilize the laser at the desired oscillation frequency.

Prior to the present invention Stark-effect tuning of molecular absorption lines had been investigated and employed for laser modulation. For a more detailed background concerning previous Stark-effect work in the laser field, reference may be made to the papers "Modulation of the 3.39-$\mu$ Ne Line by Electro-Optic Gases" by A. Landman, *Journal of Applied Physics*, Vol. 38 (1967), pages 3668–3675, and "Precision Infrared Stark Spectra of $N^{14}H_2D$ Using lamb Dip" by Brewer, Kelly and Javan, *Physical Review Letters*, Vol. 23 (1969), pages 559–563, and to Johnston et al U.S. Pat. No. 3,806,834 entitled "Stark-Effect Modulation of $CO_2$ Laser With $NH_2D$."

All of the prior work with Stark-effect tuning involved spectroscopic studies or laser beam modulation. No suggestions were made for using the Stark effect to generate a frequency discriminant which could be used to stabilize the frequency of a laser, nor was it seen that a Stark-effect cell could be incorporated into a closed loop laser system to provide accurate and reliable laser frequency stabilization.

Additional objects, advantages and characteristic features of the invention will become apparent from the following detailed description of preferred embodiments of the invention when considered in conjuntion with the accompanying drawings wherein.

Figure 1:
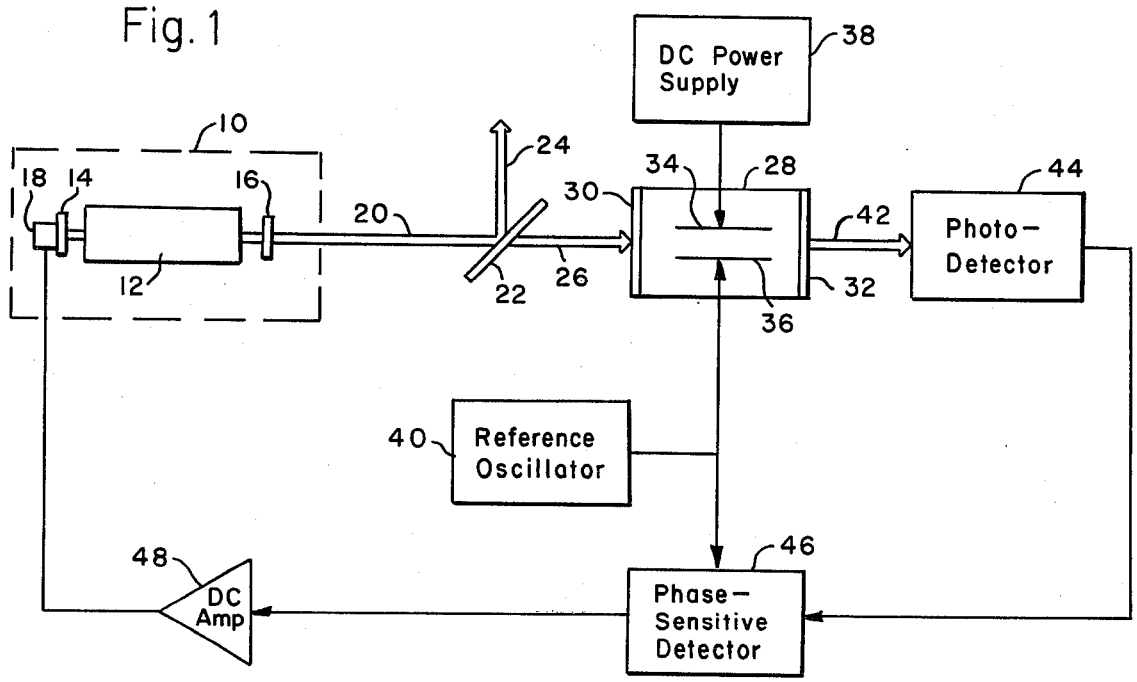
FIG. 1 is a schematic diagram illustrating a laser frequency stabilization arrangement in accordance with one embodiment of the invention.

Referring to FIG. 1 with greater particularity, there is shown a laser oscillator 10 including a laser medium 12 disposed between a pair of reflectors 14 and 16. As a specific illustrative example, the laser 10 may be a waveguide $CO_2$ laser utilizing the P(20) 10.6$\mu$ laser transition, although it should be understood that other lasers and $CO_2$ laser transitions may be employed within the principles of the invention. An electromechanical transducer 18, PZT for example, is attached to the reflector 14 to move the reflector 14 in a longitudinal direction along the laser axis and thereby adjust the frequency of oscillation of the laser 10 in accordance with a feedback control signal applied to transducer 18. The other reflector 16 may be made partially transmissive so that generated laser beam 20 may exit from the laser 10. A beam splitter 22 is disposed in the path of the laser beam 20 to divide the beam 20 into an output laser beam 24 containing most of the energy in the beam 20 and a further beam 26 containing a small portion of the energy of the beam 20 which is used in producing the feedback control signal for stabilizing the frequency of the laser 10.

Disposed in the path of the laser beam 26 is a Stark-effect cell 28. The Stark-effect cell 28 contains a gas which has an absorption resonance in the vicinity of the output frequency of the laser 10, and which resonance can be frequency tuned across the bandwidth of the laser 10 by generation of a suitable electric field within the cell 28. When the laser 10 is a $CO_2$ laser utilizing the P(20) 10.6μ transition, the Stark-effect cell 28 may contain deuterated ammonia ($NH_2D$) which has an absorption resonance corresponding to the transition $4_{04}(a) \rightarrow 5_{05}(a)$ and the frequency of which lies approximately 1,900 MHz below the line center frequency for the P(20) 10.6μ laser transition.

As a specific illustrative example for use in conjunction with the aforementioned $CO_2$ laser, the Stark-effect cell 28 may be a glass tube of a 2 cm diameter and 10 cm length filled with equal parts of $NH_3$ and $ND_3$ (which combine to form $NH_2D$) at a pressure of 0.5 Torr. The cell 28 is provided with a pair of end windows 30 and 32 of NaCl and a pair of parallel electrode plates 34 and 36 of stainless steel disposed of on opposite sides of the laser beam 26. The plates 34 and 36 may be 10 cm long and 1 cm wide with a plate separation of 1.3 mm.

Figure 2:
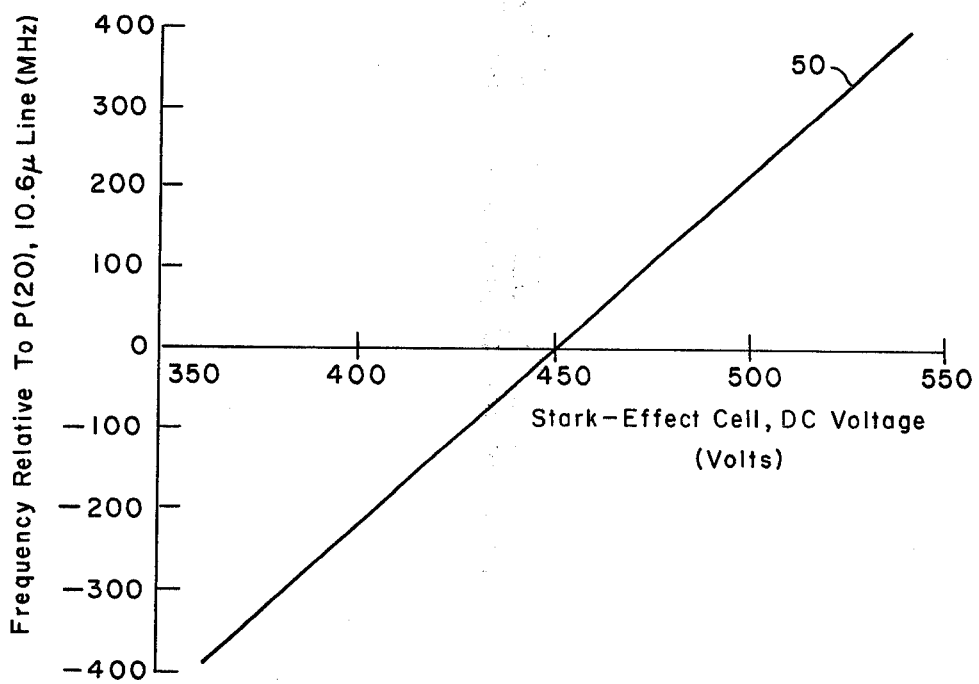
FIG. 2 is a graph showing the frequency of the absorption resonance provided by the Stark-effect cell relative to the laser transition center frequency in the arrangement of FIG. 1 as a function of the dc voltage applied to the Stark-effect cell.

In order to tune the absorption resonance provided by Stark-effect cell 28 to the desired laser oscillation frequency within the bandwidth of the laser 10, a dc voltage from a variable dc power supply 38 is applied across plates 34 and 36 of the cell 28. The frequency of the absorption resonance for the aforementioned exemplary Stark-effect cell 28 relative to the center frequency of the P(20) 10.6μ laser line as a function of the dc voltage applied to the cell 28 is shown by the characteristic 50 of FIG. 2. It may be seen that for a Stark-effect cell voltage of 450 volts, the absorption resonance coincides with the P(20) 10.6μ line center, and as the Stark-effect cell voltage is varied between 350 volts and 550 volts, the frequency of the absorption resonance varies linearly from 400 MHz below to 400 MHz above the P(20) 10.6μ line center.

Figure 3:
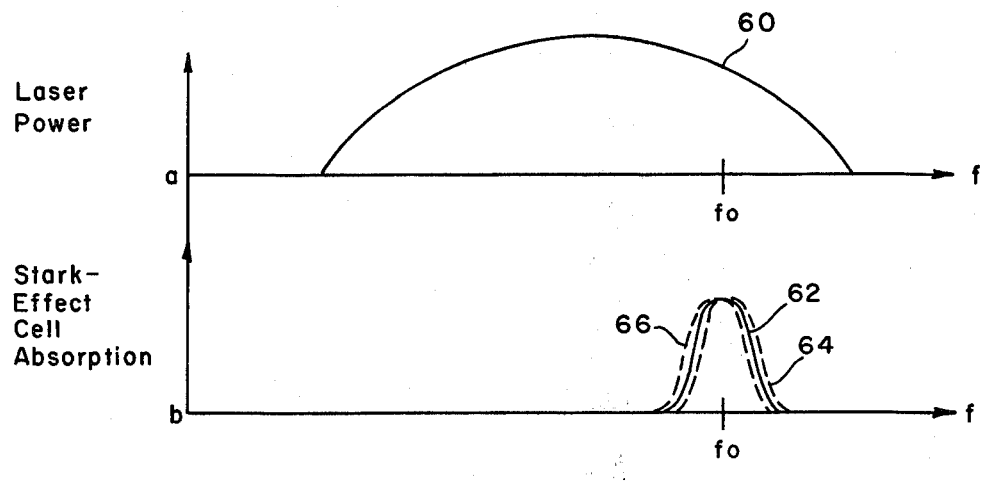
FIG. 3a is a graph of the laser output power as a function of frequency in the arrangement of FIG. 1.
FIG. 3b is a graph of the absorption provided by the Stark-effect cell as a function of frequency in the arrangement of FIG. 1.

The output power from the laser 10 as a function of frequency is illustrated by curve 60 of FIG. 3a. This curve is often referred to as the signature, or the tuning curve, of the laser. The absorption provided by the Stark-effect cell 28 as a function of frequency is shown by resonance curve 62 of FIG. 3b. The dc voltage applied to the cell 28 is selected such that the center frequency of the absorption resonance 62 corresponds to the desired laser oscillation frequency $f_o$ which may be any frequency within the laser tuning curve 60.

In order to provide an indication of the magnitude and polarity of the frequency difference between the instantaneous oscillation frequency of the laser 10 and the desired laser oscillation frequency, a frequency discriminant is produced by varying the absorption resonance of the Stark-effect cell 28 about the desired laser oscillation frequency at the frequency of an alternating reference signal. The alternating reference signal is generated by a reference oscillator 40 and is applied across plates 34 and 36 of the Stark-effect cell 28. As a specific illustrative example for use in conjunction with the aforementioned 10.6μ $CO_2$ laser and Stark-effect cell 28 having the aforedescribed specific parameter values, the reference oscillator 10 may be a sine wave generator providing a reference voltage of 20 volts peak-to-peak at a frequency of 10 kHz. As shown in FIG. 3b, the reference oscillator 40 varies the absorption resonance 62 about the frequency $f_o$ and between the limits shown by dashed absorption curves 64 and 66.

As the absorption resonance of the Stark-effect cell 28 is varied about the desired laser oscillation frequency, the laser beam 26 passing through the Stark-effect cell 28 becomes amplitude modulated. The amplitude modulation on the beam 26 is such that the amplitude of the fundamental modulation component is indicative of the magnitude of the frequency difference between the instantaneous oscillation frequency of the laser 10 and the average center frequency of the Stark-effect cell absorption resonance, and the phase of the fundamental modulation component is indicative of the polarity of the aforementioned frequency difference. The resultant amplitude modulated laser beam 42 emerging from the Stark-effect cell 28 impinges on a photodetector 44 which produces an electrical signal which varies in amplitude in accordance with the amplitude modulation on the beam 42. For laser energy in the vicinity of 10.6μ, an appropriate exemplary photodetector 44 is a HgCdTe photodiode.

The electrical output signal from the photodetector 44 and the reference signal from the reference oscillator 40 are applied to a phase-sensitive detector 46 which produces an error signal having an amplitude proportional to the amplitude of the output signal from the photodetector 44 and a polarity indicative of the phase of the photodetector output signal. Thus, the error signal has an amplitude and polarity indicative of the magnitude and polarity, respectively, of the difference between the instantaneous oscillation frequency of the laser 10 and the desired laser oscillation frequency. After being amplified in a dc amplifier 48, the error signal is fed back to the electromechanical transducer 18 to control the oscillation frequency of the laser 10 so as to minimize the error signal and thereby stabilize the frequency of the generated laser beam 20 at the desired laser oscillation frequency.

Figure 4:
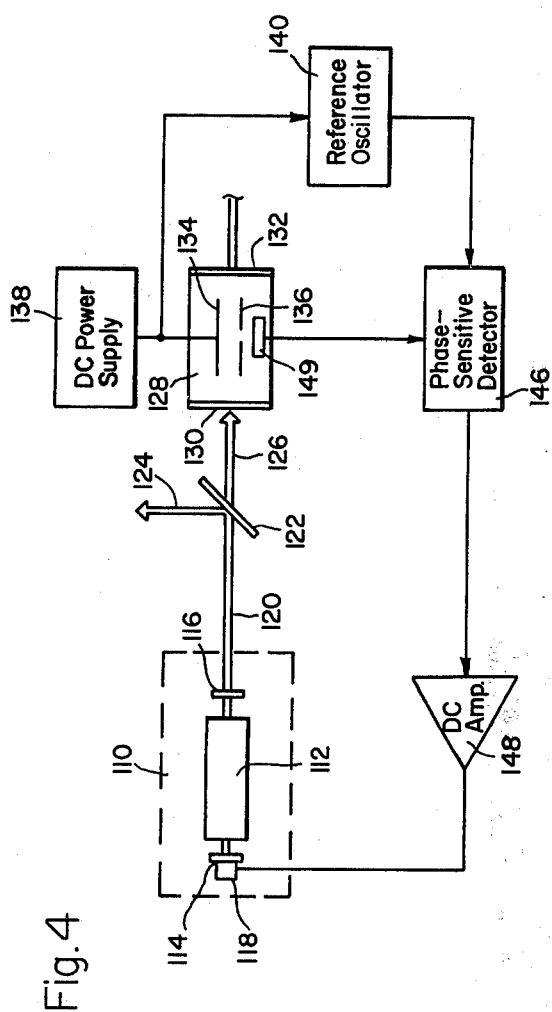
FIG. 4 is a schematic diagram illustrating a laser frequency stabilization arrangement in accordance with another embodiment of the invention.

A laser stabilization arrangement in accordance with an alternate embodiment of the invention is illustrated in FIG. 4. Components in the embodiment of FIG. 4 which are the same as or similar to corresponding components in the embodiment of FIG. 1 are designated by the same second and third reference numeral digits as their counterpart components in FIG. 1 but with the addition of the prefix numeral "1."

The embodiment of FIG. 4 differs from that of FIG. 1 in that photodetector 44 is eliminated, and variations in the amount of laser energy absorbed as laser beam 126 passes through Stark-effect cell 128 are detected by means of a microphone 149 disposed within the cell 128. The microphone 149 senses pressure waves generated within the cell 128 due to gas heating. Further details concerning measuring the absorption of laser energy in a gas by means of a pressure-sensing microphone may be found in the paper "Ultralow Gas Concentration Infrared Absorption Spectroscopy" by L. B. Kreuzer, *Journal of Applied Physics*, Vol. 42 (1971), pages 2934–2943. The electrical output signal from the microphone 149 is applied to phase-sensitive detector 146, along with the reference signal from reference oscillator 140, to produce an error signal which is fed back to transducer 118 to control the oscillation frequency of laser 110 in the same manner as described above with respect to the embodiment of FIG. 1.

Figure 5:
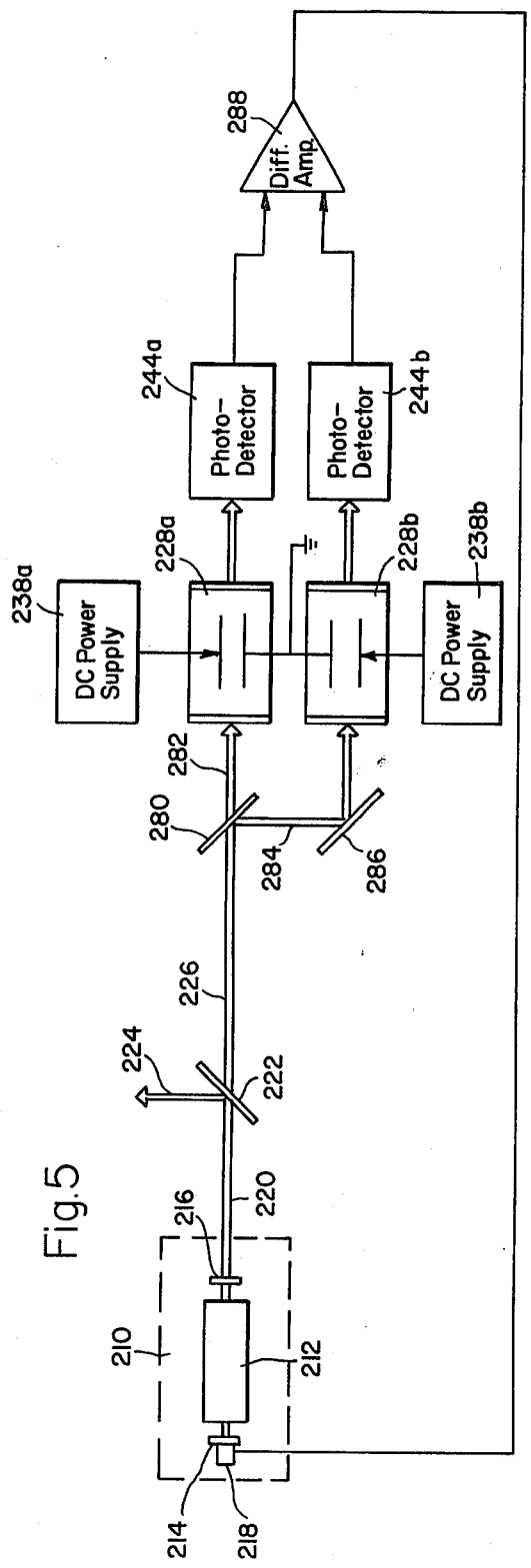
FIG. 5 is a schematic diagram illustrating a laser frequency stabilization arrangement according to a further embodiment of the invention.

A laser stabilization arrangement according to a further embodiment of the invention is illustrated in FIG. 5. Components in the embodiment of FIG. 5 which are the same as or similar to corresponding components in the embodiment of FIG. 1 are designated by the same second and third reference numeral digits as their counterpart components in FIG. 1 but with the addition of the prefix numeral "2."

Figure 6:
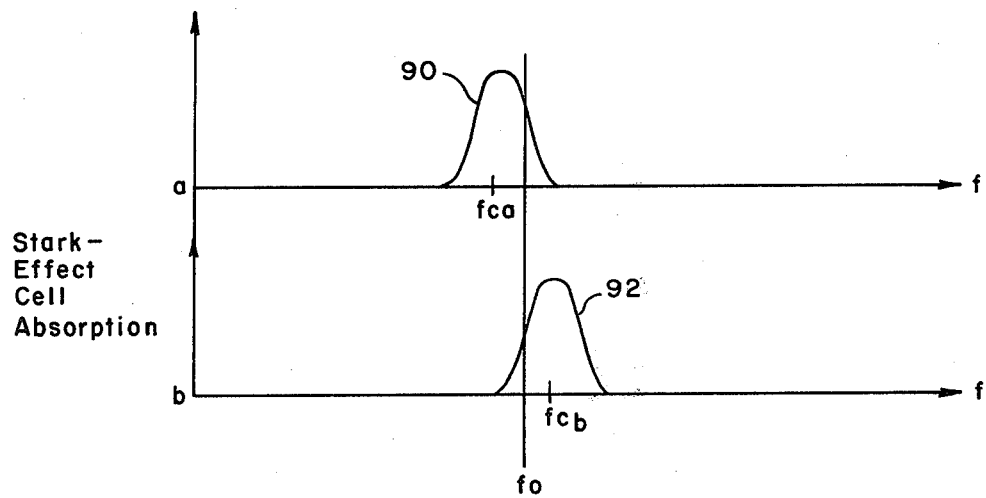
FIGS. 6a and 6b are graphs showing respective absorption vs. frequency characteristics for the pair of Stark-effect cells in the arrangement of FIG. 5.

In the embodiment of FIG. 5 laser beam 226 is divided by beam splitter 280 into a transmitted beam 282 and a reflected beam 284 of substantially equal energy. Beam 282 is passed through a first Stark-effect cell 228a while beam 284, after being reflected by reflector 286, is passed through a second Stark-effect cell 228b. The Stark-effect cells 228a and 228b provide respective absorption resonances which are stagger tuned about the desired laser oscillation frequency Specifically, Stark-effect cell 228a provides an absorption resonance (shown by curve 90 of FIG. 6a) having a center frequency $f_{ca}$ slightly below the desired laser oscillation frequency $f_0$, while Stark-effect cell 228b provides an absorption resonance (shown by curve 92 of FIG. 6b) having a center frequency $f_{cb}$ slightly above the desired laser oscillation frequency $f_0$.

The center frequency of a Stark-effect cell absorption resonance is a function of the electric field in the cell. Thus, stagger tuning of the absorption resonances for the Stark-effect cells 228a and 228b may be achieved either by biasing the respective cells 228a and 228b with different dc voltages or by employing the same bias voltage but a different Stark plate spacing for the cells 228a and 228b. Moreover, while separate power supplies 238a and 238b are shown for biasing the respective Stark-effect cells 228a and 228b, it is pointed out that a single power supply could be used and the different cell bias voltages achieved by means of a voltage divider connected across the power supply. Alternatively, a single main power supply could be employed, along with a small auxiliary supply such as a battery to provide a dc voltage which is slightly offset from the main power supply voltage.

The laser beams emerging from the respective Stark-effect cells 228a and 228b impinge upon respective photodetectors 244a and 244b which produce respective electrical signals having an amplitude indicative of the intensity of the incident laser energy. The respective electrical output signals from the photodetectors 244a and 244b are fed to a difference amplifier 288 which produces an error signal having an amplitude proportional to the amplitude difference between the respective signals from the photodetectors 244a and 244b and a polarity indicative of the polarity of the difference between the photodetector output signals. The error signal from difference amplifier 288 is fed back to electomechanical transducer 218 to control the oscillation frequency of the laser 210 so as to minimize the error signal and thereby stabilize the frequency of the generated laser beam 220 at the desired laser oscillation frequency.

More specifically, when the laser beam 220 is at the desired laser oscillation frequency $f_0$, the same amount of laser energy is absorbed in each of the Stark-effect cells 228a and 228b so that the energy in the respective laser beams incident upon photodetectors 224a and 244b is the same. The output signals form the respective photodetectors 244a and 244b are thus of equal amplitude, producing a zero error signal which maintains the oscillation frequency of the laser 210 unchanged.

In the event the frequency of the laser beam 220 decreases, the amount of laser energy absorbed by Stark-effect cell 228a will increase, while the energy absorbed by Stark-effect cell 228b will decrease. As a result, the output signal from photodetector 244b will increase in amplitude, while the output signal from photodetector 244a will decrease in amplitude. Difference amplifier 286 will then provide an error signal to increase the oscillation frequency of the laser 210. Similarly, should the frequency of the laser beam 220 increase, increased absorption will occur in cell 228b along with decreased absorption in cell 228a, resulting in an error signal which causes the oscillation frequency of the laser 210 to decrease.

Thus, it will be apparent that arrangements according to the invention are able to stabilize the oscillation frequency of a laser at any frequency within the laser tuning range, rather than only at line center frequency as was the case with the prior art. Moreover, accurate and reliable frequency stabilization is accomplished in a relatively simple and inexpensive system and without introducing undesired frequency modulation on the laser output. In addition, since only a small number of absorbing gas transitions are suitable for effective matching with desired laser transitions, arrangements according to the invention can also be used as laser line selectors for lasers such as $CO_2$ which are capable of operating on a number of laser transitions.

Although the invention has been shown and described reference to particular embodiments, nevertheless, various changes and modifications which are obvious to a person skilled in the art to which the invention pertains are deemed to be within the sprit, scope, and contemplation of the invention.

What is claimed is:

1. A frequency stabilized laser comprising:
   a laser oscillator for generating a laser beam at a frequency within a predetermined range of frequencies including a desired laser oscillation frequency, said laser oscillator including tuning means for adjusting the oscillation frequency of said laser oscillator;
   a Stark-effect cell disposed in the path of at least a portion of said laser beam and containing a gas having an absorption resonance in the vicinity of said desired laser oscillation frequency;
   means for applying a dc signal to said Stark-effect cell to adjust the center frequency of said absorption resonance to a value equal to said desired laser oscillation frequency;
   means for applying an alternating reference signal to said Stark-effect cell to vary the center frequency of said absorption resonance about said desired laser oscillation frequency at the frequency of said reference signal and thereby amplitude modulate the laser beam traversing said Stark-effect cell such that the amplitude of the fundamental modulation component is indicative of the magnitude of the frequency difference between the instantaneous oscillation frequency of said laser oscillator and the average center frequency of said absorption resonance, and the phase of said fundamental modulation component is indicative of the polarity of said frequency difference;
   means including microphone means disposed in said Stark-effect cell for sensing pressure changes in said gas resulting from changes in the amount of laser energy absorbed by said gas for producing an electrical signal corresponding to the amplitude modulation on said laser beam traversing said Stark-effect cell;

means for producing from said reference signal and said electrical signal an error signal indicative of the magnitude and polarity of said frequency difference; and means for feeding said error signal back to said tuning means to control the oscillation frequency of said laser oscillator in accordance with said error signal to stabilize said generated laser beam at said desired laser oscillation frequency.

2. A frequency stabilized laser according to claim 1 and further including beam splitter means disposed in the path of said generated laser beam for dividing said generated laser beam into a first laser beam containing most of the energy in said generated laser beam and a second laser beam directed into said Stark-effect cell and containing a small portion of the energy in said generated laser beam.

3. A frequency stabilized laser comprising:
a laser oscillator for generating a laser beam at a frequency within a predetermined range of frequencies including a desired laser oscillation frequency, said laser oscillator including tuning means for adjusting the oscillation frequency of said laser oscillator;
beam splitter means disposed in the path of said generated laser beam for dividing at least a portion of said generated laser beam into first and second laser beams traversing different paths;
first and second Stark-effect cells disposed in the respective paths of said first and second laser beams, each Stark-effect cell containing a gas having an absorption resonance in the vicinity of said desired laser oscillation frequency;
means for applying a dc signal to each of said Stark-effect cells to generate respective electric fields in said first and second cells such that the center frequency of the absorption resonance for the gas in one of said cells in slightly below said desired laser oscillation frequency and the center frequency of the absorption resonance for the gas in the other of said cells is slightly above said desired laser oscillation frequency;
means for producing first and second electrical signals indicative of the relative amount of laser energy absorbed in said first and second Stark-effect cells;
means for producing from said first and second electrical signals an error signal indicative of the difference between said first and second electrical signals; and
means for feeding said error signal back to said tuning means to control the oscillation frequency of said laser oscillator in accordance with said error signal to stabilize said generated laser beam at said desired laser oscillation frequency.

4. A frequency stabilized laser according to claim 3 wherein the respective dc signals applied to said first and second Stark-effect cells are at different voltage levels.

5. A frequency stabilized laser according to claim 3 wherein each of said Stark-effect cells includes a pair of spaced electrically conductive plates disposed parallel to one another on opposite sides of the laser beam traversing said cell and between which said dc signal is applied, the spacing of the plates of said first cell being different from the spacing of the plates of said second cell.

6. A frequency stabilized laser comprising:
a laser oscillator for generating a laser beam at a frequency within a predetermined range of frequencies including a desired laser oscillation frequency, said laser oscillator including tuning means for adjusting the oscillation frequency of said laser oscillator;
beam splitter means disposed in the path of said generated laser beam for dividing at least a portion of said generated laser beam into first and second laser beams of substantially equal energy and traversing different paths;
first and second Stark-effect cells disposed in the respective paths of said first and second laser beams, each Stark-effect cell containing a gas having an absorption resonance in the vicinity of said desired laser oscillation frequency;
means for applying a dc signal to each of said Stark-effect cells to generate respective electric fields in said first and second cells such that the center frequency of the absorption resonance for the gas in one of said cells is slightly below said desired laser oscillation frequency and the center frequency of the absorption resonance for the gas in the other of said cells is slightly above said desired laser oscillation frequency;
first and second photodetector means for producing from said first and second laser beams respective first and second electrical signals of an amplitude indicative of the amount of laser energy absorbed in said first and second Stark-effect cells, respectively;
difference amplifier means for producing from said first and second electrical signals an error signal indicative of the magnitude and polarity of the difference in amplitude between said first and second electrical signals; and
means for feeding said error signal back to said tuning means to control the oscillation frequency of said laser oscillator in accordance with said error signal to stabilize said generated laser beam at said desired laser oscillation frequency.

\* \* \* \* \*